UNITED STATES PATENT OFFICE 2,583,110

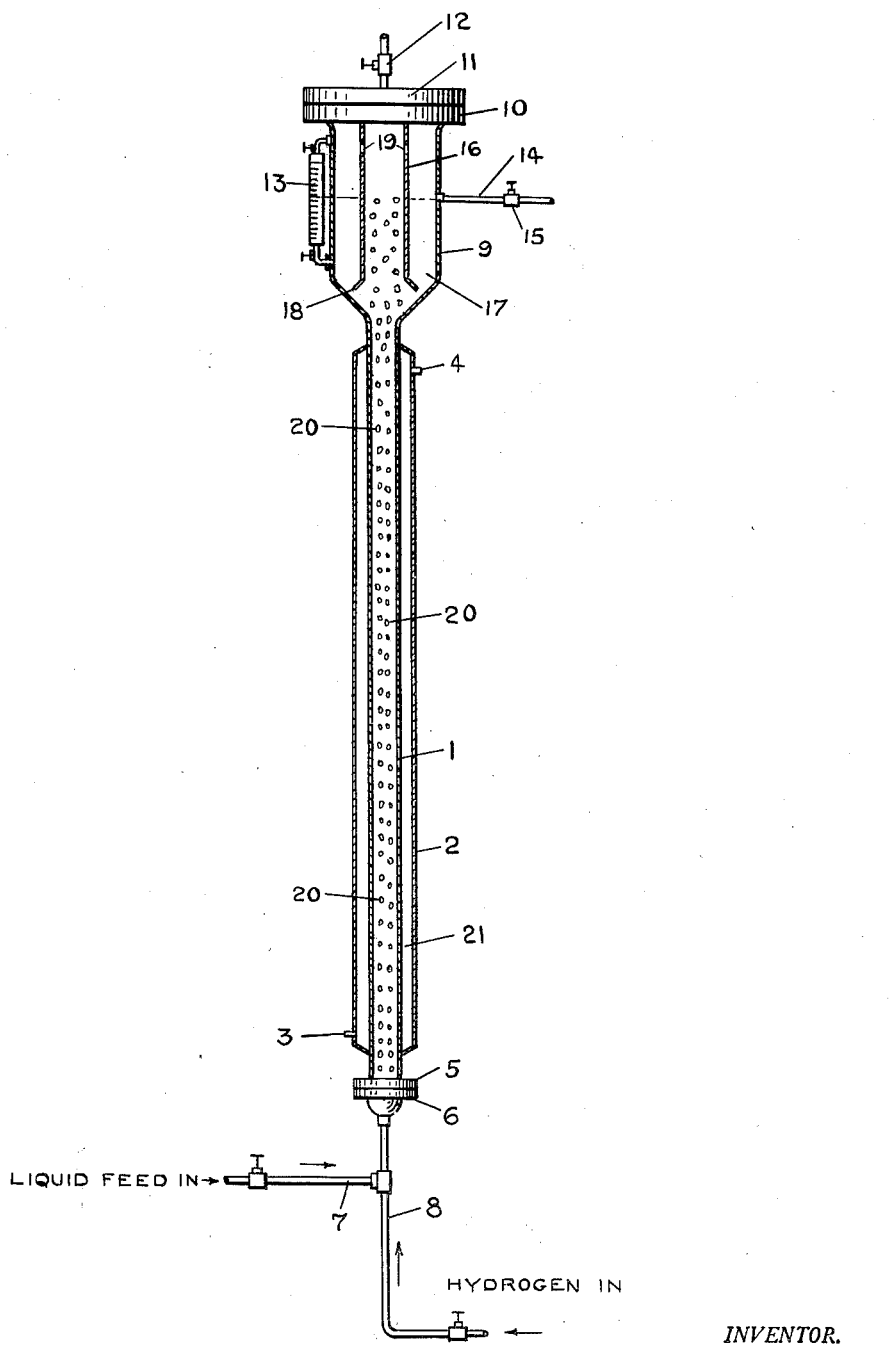

REACTION APPARATUS

Alexander F. MacLean, Robstown, Tex., assignor to Celanese Corporation of America, a corporation of Delaware Application September 11, 1948, Serial No. 48,881

7 Claims. (Cl. 23—285)

This invention relates to a novel reactor and relates more particularly to an apparatus of improved design for the continuous, catalytic reaction of organic compounds with a gaseous reactant.

In hydrogenating organic compounds, for example, in a continuous manner employing a catalyst, such as Raney nickel, the catalyst may be utilized either as a fixed bed when deposited on a suitable inert carrier or in a finely-divided form so that it may be circulated through a reaction vessel or a series of reaction vessels as a slurry with the compound or compounds undergoing hydrogenation. Adequate temperature control with a fixed catalyst bed has been found to be difficult.

It has also been observed that circulation of the abrasive catalyst particles through the reaction vessels as by means of pumps as a slurry with the liquid feed is also quite unsatisfactory since the catalyst particles present in the feed not only render the maintenance of suitable flow rates difficult but catalyst losses in the hydrogenated product taken off are excessive.

It is, therefore, an important object of this invention to provide an improved apparatus wherein the continuous catalytic reaction of organic compounds with gases may be effected with adequate catalyst circulation without employing pumping means for circulating the catalyst.

Another object of this invention is the provision of a novel apparatus for the catalytic reaction of organic compounds in which the reaction is effected efficiently and without excessive catalyst loss.

Other objects of this invention will appear from the following detailed description and the accompanying drawing.

In the drawing, wherein a preferred embodiment of my invention is shown, the figure is a side-elevational view, partly in section, of the novel reactor of my invention. Like numerals indicate like parts throughout the drawing.

Referring now to the drawing, the novel apparatus of my invention comprises a central cylindrical tube 1 surrounded by a heating jacket 2 having an inlet 3 and an outlet 4 each communicating with the annular space 21 thus formed so that a suitable heating medium may be circulated therethrough. The central cylindrical tube 1 is provided with a flange 5 at the lower end thereof suitably attached to a flange 6 which has a valved liquid feed inlet 7 and a valved hydrogen inlet 8 attached thereto and so arranged as to communicate with tube 1. The upper end of the central cylindrical tube 1 is flared outwardly to form a wide cylindrical head 9. Head 9 has a flange 10 integral therewith and is sealed by means of a cover 11 which is provided with a vent valve 12. Head 9 is also provided with a liquid level gauge 13 and a liquid takeoff line 14 having a valve 15 therein. Integral with cover 11 is a flared tube 16 which extends downwardly and below the level of the liquid in the annular space 17 formed by the walls of cylindrical head 9 and the tube 16. The outwardly flared lip 18 of tube 16 gives the base of the latter a slight bell-shape and lip 18 is, as shown, spaced slightly from the inner surface of cylindrical head 9. Perforations 19 are provided in tube 16 to allow the gas pressure throughout the head to be equalized. Perforations 19 are above the liquid level in the cylindrical head.

In effecting hydrogenation reactions, for example, employing the novel reactor of my invention, the organic compound or compounds to be hydrogenated are pumped into the reactor through inlet 7 with the hydrogenation catalyst employed being entered at the top. Hydrogen gas is introduced at a suitable rate and at the desired pressure through inlet 8 and the hydrogen rises through tube 1 as bubbles 20. The desired reaction temperature is maintained by circulating a suitable heating medium such as steam or hot water, for example, through heating jacket 2. The movement of hydrogen bubbles 20 up through the liquid, which is also moving through shell 1 to the level of liquid take-off 14, effectively agitates the liquid and acts to keep the catalyst in suspension. Flared tube 16 acts to contain and to guide the bubbles of excess or unreacted hydrogen to vent valve 12 through which it is bled. The unreacted hydrogen may be recycled in admixture with fresh hydrogen at a rate sufficient to yield optimum turbulence. By continuously venting the unreacted hydrogen at a suitable rate continuous agitation of the liquid within flared tube 16 is thus attained. Since flared tube 16 guides the moving hydrogen bubbles so that they are contained within said tube, the annular space 17 in which the liquid reaction mixture rises to the level of liquid take-off 14 comprises a relatively quiet zone wherein little or no agitation takes place. Accordingly, any catalyst which may be carried up into annular space 17 with the liquid settles out relatively easily and falls back into the liquid reaction mixture contained in tube 1 to further catalyze the hydrogenation reaction taking place. The clear liquid product at the top of annular space 17 is removed through liquid take-off 14. If hydrogenation to a further degree is necessary or desirable, the clear liquid thus removed may be continuously passed as the liquid feed to a second catalytic reactor of the same construction and arrangement of parts in series with the reactor described. A clear, hydrogenated reaction product is thus continuously formed.

In lieu of venting the unreacted hydrogen through vent valve 12, the vent valve 12 may be closed and the hydrogen vented by passage through perforations 19 and taken from the reaction as a gas/liquid mixture through take-off 14. Where further hydrogenation is to be effected the gas/liquid mixture is passed through another reactor in series containing the finely-divided catalyst in suspension. If no further hydrogenation is to be effected the gas/liquid mixture may be passed to a suitable gas separator.

By employing the novel apparatus of my invention, catalyst loss is kept at a minimum, a high degree of agitation is attained with a consequent increased rate of reaction, and the pumping of abrasive catalyst is substantially eliminated. Thus, for example, with a 10% by weight concentration of Raney nickel catalyst in the liquid reaction mixture present in the reactor, the clear hydrogenated product drawn off contains only about 0.094% by weight of the catalyst.

While the novel reactor of my invention has been described more particularly in connection with hydrogenation reactions, it may also be employed for oxidation reactions, halogenation reactions, condensations, etc., wherein a gaseous reactant is employed together with a catalyst comprising solid particles which are suspended in the reaction mixture by the circulation of the gaseous reactant therethrough.

It is to be understood that the foregoing detailed description is given merely by way of illustration and that many variations may be made therein without departing from the spirit of my invention.

Having described my invention, what I desire to secure by Letters Patent is:

1. In apparatus for effecting a catalytic gas/liquid chemical reaction, wherein a gas is passed upwardly through a liquid in the presence of a finely-divided catalyst to agitate the same and to maintain the catalyst particles in suspension therein, a reaction vessel through which the liquid and reactants are passed, said reaction vessel comprising a tube disposed in a vertical plane and having at its upper extremity a head of greater diameter than said tube, a second tube disposed in a vertical plane within said head and being spaced from the inner wall of said head whereby said head is divided into two sections, said second tube having an internal diameter at least as large as said first-mentioned tube, being arranged co-axially with said first-mentioned tube and having the open lower end thereof substantially adjacent to the open upper end of said first-mentioned tube and communicating therewith, and said second tube having an opening therein joining the two said sections, separate means for introducing the liquid and gaseous reactants into the base of said first-mentioned tube, and means connected to said head at a point above the lower end of said second tube for withdrawing liquid from said head whereby the head will be filled with liquid to a point above the lower end of said second tube, the construction and arrangement being such that the second tube receives a mixture of liquid and catalyst from said first-mentioned tube and permits of a flow of liquid free from catalyst into the section around said second tube.

2. In apparatus for effecting a catalytic gas/liquid chemical reaction, wherein a gas is passed upwardly through a liquid in the presence of a finely-divided catalyst to agitate the same and to maintain the catalyst particles in suspension therein, a reaction vessel through which the liquid and reactants are passed, said reaction vessel comprising a tube disposed in a vertical plane and having at its upper extremity a head of greater diameter than said tube, a cover on said head, a second tube, attached to said cover, disposed in a vertical plane within said head and being spaced from the inner wall of said head whereby said head is divided into two sections, said second tube having an internal diameter at least as large as said first-mentioned tube, being arranged co-axially with said first-mentioned tube and having the open lower end thereof substantially adjacent to the open upper end of said first-mentioned tube and communicating therewith, and said second tube having an opening therein joining the two said sections, separate means for introducing the liquid and gaseous reactants into the base of said first-mentioned tube, and means connected to said head at a point above the lower end of said second tube for withdrawing liquid from said head whereby the head will be filled with liquid to a point above the lower end of said second tube, the construction and arrangement being such that the second tube receives a mixture of liquid and catalyst from said first-mentioned tube and permits of a flow of liquid free from catalyst into the section around said second tube.

3. In apparatus for effecting a catalytic gas/liquid chemical reaction, wherein a gas is passed upwardly through a liquid in the presence of a finely-divided catalyst to agitate the same and to maintain the catalyst particles in suspension therein, a reaction vessel through which the liquid and reactants are passed, said reaction vessel comprising a tube disposed in a vertical plane and having at its upper extremity a head of greater diameter than said tube, a second tube disposed in a vertical plane within said head and being spaced from the inner wall of said head whereby said head is divided into two sections, said second tube having an internal diameter at least as large as said first-mentioned tube, being arranged co-axially with said first-mentioned tube and having the open lower end thereof substantially adjacent to the open upper end of said first-mentioned tube and communicating therewith, and said second tube having an opening therein joining the two said sections, separate means for introducing the liquid and gaseous reactants into the base of said first-mentioned tube, means connected to said head at a point above the lower end of said second tube for withdrawing liquid from said head whereby the head will be filled with liquid to a point above the lower end of said second tube, the construction and arrangement being such that the second tube receives a mixture of liquid and catalyst from said first-mentioned tube and permits of a flow of liquid free from catalyst into the section around said second tube, and means communicating with said second tube for venting the unreacted gas.

4. In apparatus for effecting a catalytic gas/liquid chemical reaction, wherein a gas is passed upwardly through a liquid in the presence of a finely-divided catalyst to agitate the same and to maintain the catalyst particles in suspension therein, a reaction vessel through which the liquid and reactants are passed, said reaction vessel comprising a tube disposed in a vertical plane and having at its upper extremity a head of greater diameter than said tube, a second tube disposed in a vertical plane within said head and being spaced from the inner wall of said head whereby said head is divided into two sections, said second tube having an internal diameter at least as large as said first-mentioned tube, being arranged co-axially with said first-mentioned tube and having the open lower end thereof substantially adjacent to the open upper end of said first-mentioned tube and communicating therewith, and said second tube having an opening therein joining the two said sections, separate means for introducing the liquid and gaseous reactants into the base of said first-mentioned tube, means connected to said head at a point above the lower end of said second tube for withdrawing liquid from said head whereby the head will be filled with liquid to a point above the lower end of said second tube, the construction and arrangement being such that the second tube receives a mixture of liquid and catalyst from said first-mentioned tube and permits of a flow of liquid free from catalyst into the section around said second tube, means communicating with said second tube for venting unreacted gas, and means for withdrawing clear liquid product from the section around said second tube.

5. In apparatus for effecting a catalytic gas/liquid chemical reaction wherein a gas is passed upward through a liquid in the presence of a finely-divided catalyst to agitate the same and to maintain the catalyst particles in suspension therein, a reaction vessel through which the liquid and gaseous reactants are passed, said reaction vessel comprising a tube disposed in a vertical plane having at its upper extremity a flared head of greater diameter than said tube, a tube disposed in a vertical plane within said head, arranged co-axially with said first-mentioned tube and having an opening communicating therewith, spaced from the inner wall thereof whereby said head is divided into two sections, said second tube having an opening therein joining said two sections and having a flared end restricting the space between the inner wall of said head and the said latter tube, and means for introducing the liquid and gaseous reactants into said first-mentioned tube, the construction and arrangement being such that the unreacted gas is separated from the liquid reaction mixture in one of said zones and the liquid product, substantially free of catalyst particles, is separated in the other of said zones.

6. In apparatus for effecting a catalytic gas/liquid chemical reaction wherein a gas is passed upward through a liquid in the presence of a finely-divided catalyst to agitate the same and to maintain the catalyst particles in suspension therein, a reaction vessel through which the liquid and gaseous reactants are passed, said reaction vessel comprising a tube disposed in a vertical plane having at its upper extremity a flared head of greater diameter than said tube, a cover on said head, a tube disposed in a vertical plane within said head attached to said cover, said tube being arranged co-axially with said first-mentioned tube and having an opening communicating therewith and being spaced from the inner wall thereof whereby said head is divided into two sections, said second tube having an opening therein joining said two sections and having a flared end restricting the space between the inner wall of said head and the said latter tube, and means for introducing the liquid and gaseous reactants into said first-mentioned tube, the construction and arrangement being such that the unreacted gas is separated from the liquid reaction mixture in one of said zones and the liquid product, substantially free of catalyst particles, is separated in the other of said zones.

7. In apparatus for effecting a catalytic gas/liquid chemical reaction wherein a gas is passed upward through a liquid in the presence of a finely-divided catalyst to agitate the same and to maintain the catalyst particles in suspension therein, a reaction vessel through which the liquid and gaseous reactants are passed, said reaction vessel comprising a tube disposed in a vertical plane having at its upper extremity a flared head of greater diameter than said tube, a cover on said head, a tube disposed in a vertical plane within said head attached to said cover, said tube being arranged co-axially with said first-mentioned tube and having an opening communicating therewith and being spaced from the inner wall thereof whereby said head is divided into two sections, said second tube having an opening therein joining said two sections and having a flared end restricting the space between the inner wall of said head and the said latter tube, means for introducing the liquid and gaseous reactants into said first-mentioned tube, the construction and arrangement being such that the unreacted gas is separated from the liquid reaction mixture in one of said zones and the liquid product, substantially free of catalyst particles, is separated in the other of said zones, and means communicating with said zones for venting unreacted gas and withdrawing clear liquid product therefrom.

ALEXANDER F. MacLEAN.

REFERENCES CITED

The following references are of record in the file of this patent:

UNITED STATES PATENTS

| Number | Name | Date |
| --- | --- | --- |
| 748,894 | Trump | Jan. 5, 1904 |
| 1,404,709 | Allbright | Jan. 24, 1922 |
| 1,560,473 | Howard | Nov. 3, 1925 |
| 2,088,497 | Tijmstra | July 27, 1937 |
| 2,484,799 | Swindin | Oct. 11, 1949 |